United States Patent
Bui et al.

(10) Patent No.: US 9,640,209 B1
(45) Date of Patent: May 2, 2017

(54) GENERATING DEFECT SIGNALS IN TIME BASED SERVO TAPE STORAGE SYSTEMS

(71) Applicant: International Business Machines Corporation, Armonk, NY (US)

(72) Inventors: Nhan X. Bui, Tucson, AZ (US); Eiji Ogura, Yokohama (JP); Tomoko Taketomi, Yamato (JP); Kazuhiro Tsuruta, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/271,144

(22) Filed: Sep. 20, 2016

(51) Int. Cl.
  *G11B 5/584* (2006.01)
  *G11B 20/18* (2006.01)

(52) U.S. Cl.
  CPC .......... *G11B 5/584* (2013.01); *G11B 20/1816* (2013.01)

(58) Field of Classification Search
  CPC ......... G11B 5/55–5/5517; G11B 5/584; G11B 20/1816
  USPC .... 360/31, 53, 55, 69, 72.1–72.2, 75, 77.12, 360/78.02
  See application file for complete search history.

(56) References Cited

U.S. PATENT DOCUMENTS

| | | | |
|---|---|---|---|
| 6,031,673 A | 2/2000 | Fasen et al. | |
| 6,791,781 B2* | 9/2004 | Bui | G11B 5/584 360/51 |
| 6,865,052 B2* | 3/2005 | Chliwnyj | G11B 5/584 360/77.12 |
| 7,212,365 B2* | 5/2007 | Hashimoto | G11B 5/584 360/75 |
| 7,365,929 B2* | 4/2008 | Cherubini | G11B 5/59688 360/73.12 |
| 7,411,759 B2* | 8/2008 | Trabert | G11B 5/584 360/77.12 |

(Continued)

FOREIGN PATENT DOCUMENTS

| | | |
|---|---|---|
| EP | 767451 A1 | 4/1997 |
| GB | 2508390 A | 6/2014 |
| WO | 2014032458 A1 | 3/2014 |

OTHER PUBLICATIONS

Dee, "Magnetic Tape forData Storage: An Enduring Technology," IEEE, vol. 96, No. 11, Nov. 2008, pp. 1775-1785.

*Primary Examiner* — Wayne Young
*Assistant Examiner* — James L Habermehl
(74) *Attorney, Agent, or Firm* — Zilka-Kotab, PC

(57) ABSTRACT

In one embodiment, a computer-implemented method for simulating a defect signal in a time based servo system includes determining a start position for a spike, determining an end position for the spike, determining a servo channel, determining an amplitude of the spike, initiating an acquire lock process, creating the spike in the determined servo channel from the determined start position to the determined end position, and storing servo data including at least a portion thereof generated during the spike. The spike has the determined amplitude. In another embodiment, a computer program product for generating defect signals in a storage system includes a computer readable storage medium having program instructions embodied therewith, wherein the computer readable storage medium is not a transitory signal per se. The program instructions are executable by a controller to perform the foregoing method.

20 Claims, 14 Drawing Sheets

(56) References Cited

U.S. PATENT DOCUMENTS

| | | | |
|---|---|---|---|
| 7,724,466 B2 * | 5/2010 | Bui | G11B 5/584 |
| | | | 360/77.12 |
| 9,378,764 B2 * | 6/2016 | Trabert | G11B 5/584 |
| 2002/0167753 A1 | 11/2002 | Basham et al. | |
| 2008/0055768 A1 | 3/2008 | Bates et al. | |
| 2008/0198500 A1 | 8/2008 | Weber et al. | |

* cited by examiner

GENERATING DEFECT SIGNALS IN TIME BASED SERVO TAPE STORAGE SYSTEMS

BACKGROUND

The present invention relates to data storage systems, and more particularly, this invention relates to generating defect signals in magnetic recording tape storage systems.

In magnetic storage systems, magnetic transducers read data from and write data onto magnetic recording media. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track and linear bit density on recording tape, and decreasing the thickness of the magnetic tape medium. However, the development of small footprint, higher performance tape drive systems has created various problems in the design of a tape head assembly for use in such systems.

In a tape drive system, the drive moves the magnetic tape over the surface of the tape head at high speed. Usually the tape head is designed to minimize the spacing between the head and the tape. The spacing between the magnetic head and the magnetic tape is crucial and so goals in these systems are to have the recording gaps of the transducers, which are the source of the magnetic recording flux in near contact with the tape to effect writing sharp transitions, and to have the read elements in near contact with the tape to provide effective coupling of the magnetic field from the tape to the read elements.

SUMMARY

In one embodiment, a computer-implemented method for simulating a defect signal in a time based servo system includes determining a start position for a spike, determining an end position for the spike, determining a servo channel, determining an amplitude of the spike, initiating an acquire lock process, creating the spike in the determined servo channel from the determined start position to the determined end position, and storing servo data including at least a portion thereof generated during the spike. The spike has the determined amplitude.

In another embodiment, a computer program product for generating defect signals in a storage system includes a computer readable storage medium having program instructions embodied therewith, wherein the computer readable storage medium is not a transitory signal per se. The program instructions are executable by a controller to cause the controller to perform the foregoing method.

In yet another embodiment, an apparatus configured to simulate a defect signal in a time based servo system includes a controller having a memory, and logic configured to cause the controller to perform the foregoing method.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems, as well as operation and/or component parts thereof.

In one general embodiment, a tape-based data storage system includes a computer-implemented method for simulating a defect signal in a time based servo system includes determining a start position for a spike, determining an end position for the spike, determining a servo channel, determining an amplitude of the spike, initiating an acquire lock process, creating the spike in the determined servo channel from the determined start position to the determined end position, and storing servo data including at least a portion thereof generated during the spike. The spike has the determined amplitude.

In another general embodiment, a computer program product for generating defect signals in a storage system includes a computer readable storage medium having program instructions embodied therewith, wherein the computer readable storage medium is not a transitory signal per se. The program instructions are executable by a controller to perform the foregoing method.

In yet another general embodiment, an apparatus configured to simulate a defect signal in a time based servo system includes a controller having a memory, and logic configured to cause the controller to perform the foregoing method.

Figure 1A:
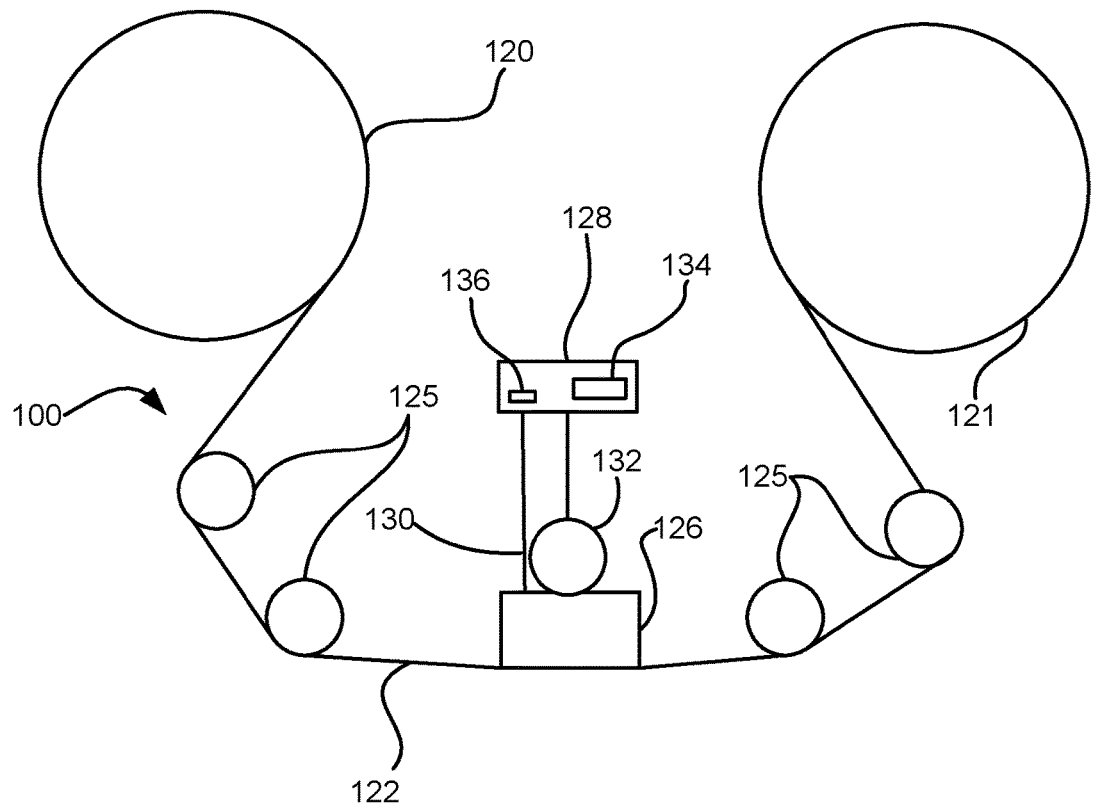
FIG. 1A is a schematic diagram of a simplified tape drive system according to one embodiment.

FIG. 1A illustrates a simplified tape drive 100 of a tape-based data storage system, which may be employed in the context of the present invention. While one specific implementation of a tape drive is shown in FIG. 1A, it should be noted that the embodiments described herein may be implemented in the context of any type of tape drive system.

As shown, a tape supply cartridge 120 and a take-up reel 121 are provided to support a tape 122. One or more of the reels may form part of a removable cartridge and are not necessarily part of the system 100. The tape drive, such as that illustrated in FIG. 1A, may further include drive motor(s) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 typically controls head functions such as servo following, data writing, data reading, etc. The controller 128 may include at least one servo channel and at least one data channel, each of which include data flow processing logic configured to process and/or store information to be written to and/or read from the tape 122. The controller 128 may operate under logic known in the art, as well as any logic disclosed herein, and thus may be considered as a processor for any of the descriptions of tape drives included herein, in various embodiments. The controller 128 may be coupled to a memory 136 of any known type, which may store instructions executable by the controller 128. Moreover, the controller 128 may be configured and/or programmable to perform or control some or all of the methodology presented herein. Thus, the controller 128 may be considered to be configured to perform various operations by way of logic programmed into one or more chips, modules, and/or blocks; software, firmware, and/or other instructions being available to one or more processors; etc., and combinations thereof.

The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive 100 and a host (internal or external) to send and receive the data and for controlling the operation of the tape drive 100 and communicating the status of the tape drive 100 to the host, all as will be understood by those of skill in the art.

Figure 1B:
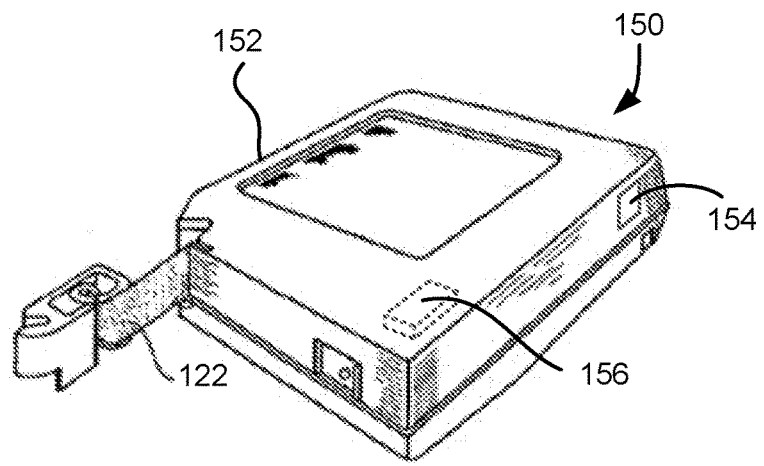
FIG. 1B is a schematic diagram of a tape cartridge according to one embodiment.

FIG. 1B illustrates an exemplary tape cartridge 150 according to one embodiment. Such tape cartridge 150 may be used with a system such as that shown in FIG. 1A. As shown, the tape cartridge 150 includes a housing 152, a tape 122 in the housing 152, and a nonvolatile memory 156 coupled to the housing 152. In some approaches, the nonvolatile memory 156 may be embedded inside the housing 152, as shown in FIG. 1B. In more approaches, the nonvolatile memory 156 may be attached to the inside or outside of the housing 152 without modification of the housing 152. For example, the nonvolatile memory may be embedded in a self-adhesive label 154. In one preferred embodiment, the nonvolatile memory 156 may be a Flash memory device, ROM device, etc., embedded into or coupled to the inside or outside of the tape cartridge 150. The nonvolatile memory is accessible by the tape drive and the tape operating software (the driver software), and/or other device.

Figure 2:
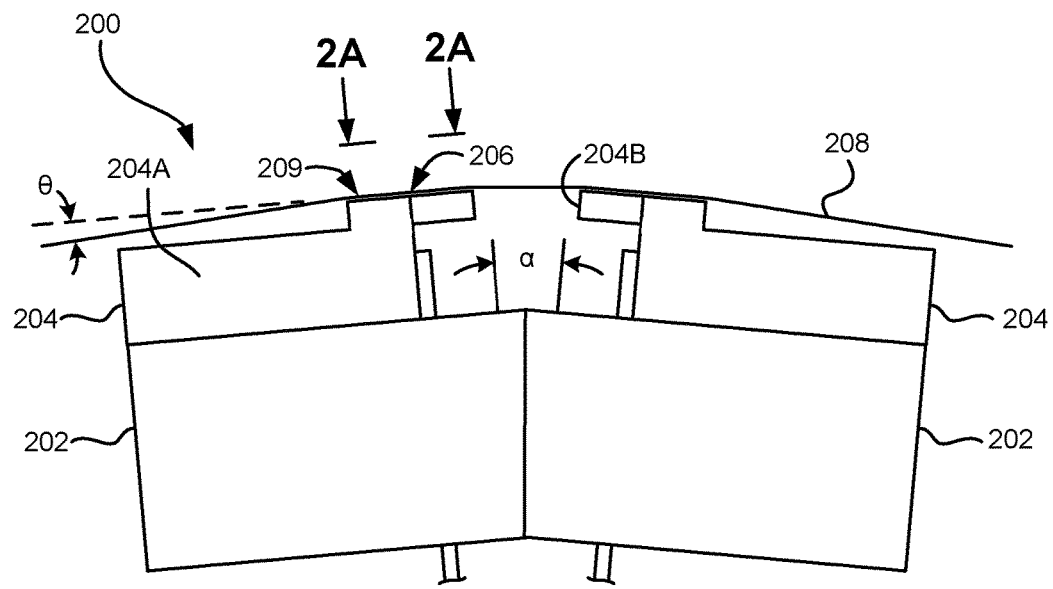
FIG. 2 illustrates a side view of a flat-lapped, bi-directional, two-module magnetic tape head according to one embodiment.

By way of example, FIG. 2 illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the readers and/or writers 206 are formed. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between about 0.1 degree and about 3 degrees.

The substrates 204A are typically constructed of a wear resistant material, such as a ceramic. The closures 204B may be made of the same or similar ceramic as the substrates 204A.

The readers and writers may be arranged in a piggyback or merged configuration. An illustrative piggybacked configuration comprises a (magnetically inductive) writer transducer on top of (or below) a (magnetically shielded) reader transducer (e.g., a magnetoresistive reader, etc.), wherein the poles of the writer and the shields of the reader are generally separated. An illustrative merged configuration comprises one reader shield in the same physical layer as one writer pole (hence, "merged"). The readers and writers may also be arranged in an interleaved configuration. Alternatively, each array of channels may be readers or writers only. Any of these arrays may contain one or more servo track readers for reading servo data on the medium.

Figure 2A:
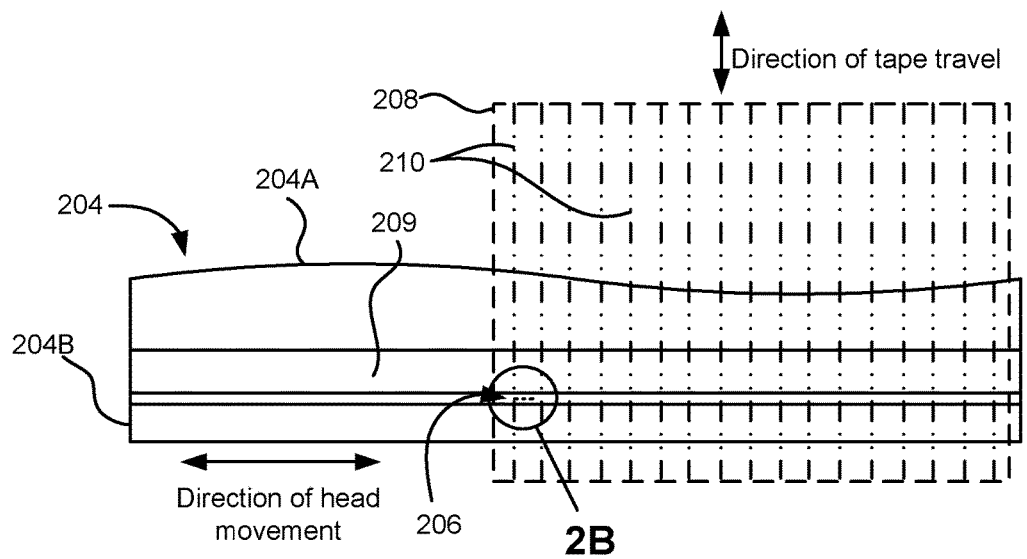
FIG. 2A is a tape bearing surface view taken from Line 2A of FIG. 2.

FIG. 2A illustrates the tape bearing surface 209 of one of the modules 204 taken from Line 2A of FIG. 2. A representative tape 208 is shown in dashed lines. The module 204 is preferably long enough to be able to support the tape as the head steps between data bands.

In this example, the tape 208 includes 4 to 32 data bands, e.g., with 16 data bands and 17 servo tracks 210, as shown in FIG. 2A on a one-half inch wide tape 208. The data bands are defined between servo tracks 210. Each data band may include a number of data tracks, for example 1024 data tracks (not shown). During read/write operations, the readers and/or writers 206 are positioned to specific track positions within one of the data bands. Outer readers, sometimes called servo readers, read the servo tracks 210. The servo signals are in turn used to keep the readers and/or writers 206 aligned with a particular set of tracks during the read/write operations.

Figure 2B:
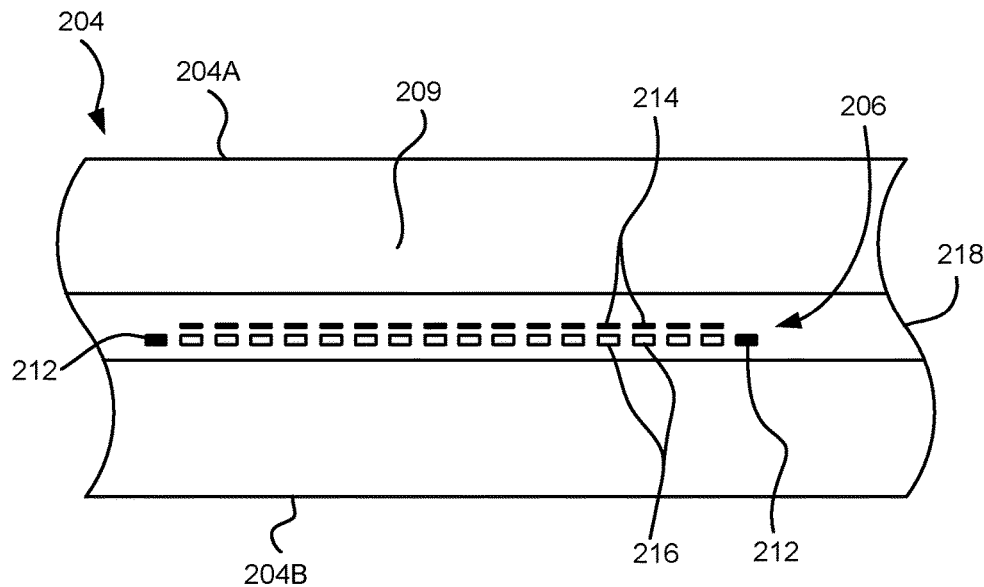
FIG. 2B is a detailed view taken from Circle 2B of FIG. 2A.

FIG. 2B depicts a plurality of readers and/or writers 206 formed in a gap 218 on the module 204 in Circle 2B of FIG. 2A. As shown, the array of readers and writers 206 includes, for example, 16 writers 214, 16 readers 216 and two servo readers 212, though the number of elements may vary. Illustrative embodiments include 8, 16, 32, 40, and 64 active readers and/or writers 206 per array, and alternatively interleaved designs having odd numbers of reader or writers such as 17, 25, 33, etc. An illustrative embodiment includes 32 readers per array and/or 32 writers per array, where the actual number of transducer elements could be greater, e.g., 33, 34, etc. This allows the tape to travel more slowly, thereby reducing speed-induced tracking and mechanical difficulties and/or execute fewer "wraps" to fill or read the tape. While the readers and writers may be arranged in a piggyback configuration as shown in FIG. 2B, the readers 216 and writers 214 may also be arranged in an interleaved configuration. Alternatively, each array of readers and/or writers 206 may be readers or writers only, and the arrays may contain one or more servo readers 212. As noted by considering FIGS. 2 and 2A-B together, each module 204 may include a complementary set of readers and/or writers 206 for such things as bi-directional reading and writing, read-while-write capability, backward compatibility, etc.

Figure 2C:
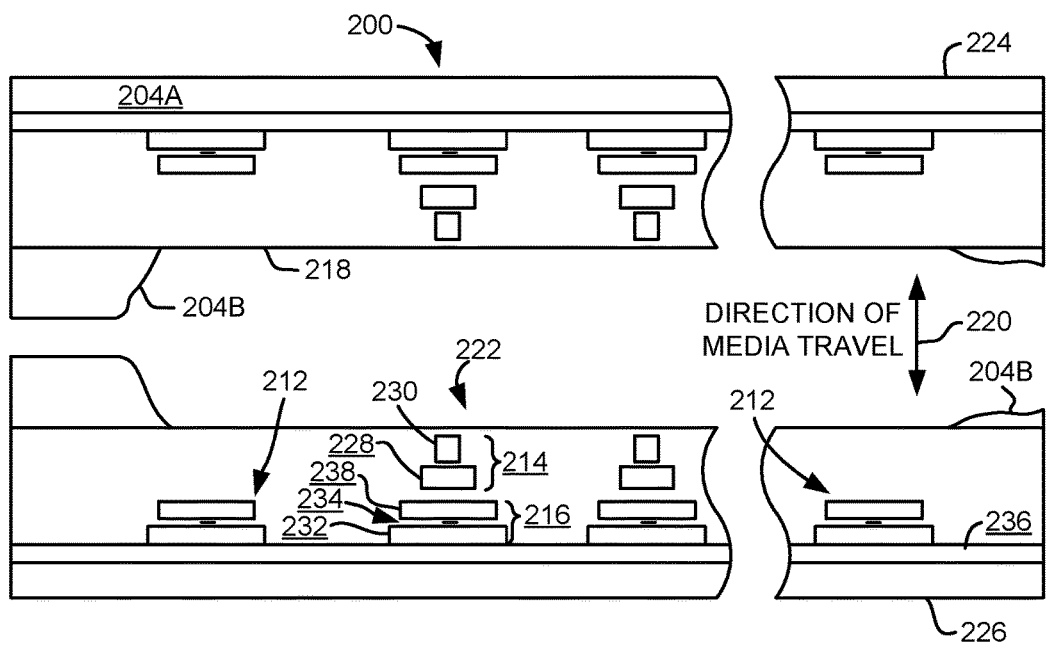
FIG. 2C is a detailed view of a partial tape bearing surface of a pair of modules.

FIG. 2C shows a partial tape bearing surface view of complementary modules of a magnetic tape head 200 according to one embodiment. In this embodiment, each module has a plurality of read/write (R/W) pairs in a piggyback configuration formed on a common substrate 204A and an optional electrically insulative layer 236. The writers, exemplified by the write transducer 214 and the readers, exemplified by the read transducer 216, are aligned parallel to an intended direction of travel of a tape medium thereacross to form an R/W pair, exemplified by the R/W pair 222. Note that the intended direction of tape travel is sometimes referred to herein as the direction of tape travel, and such terms may be used interchangeably. Such direction of tape travel may be inferred from the design of the system, e.g., by examining the guides; observing the actual direction of tape travel relative to the reference point; etc. Moreover, in a system operable for bi-direction reading and/or writing, the direction of tape travel in both directions is typically parallel and thus both directions may be considered equivalent to each other.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The piggybacked MR head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a piggyback head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (—), cobalt zirconium tantalum (CZT) or Al—Fe—Si (Sendust), a sensor 234 for sensing a data track on a magnetic medium, a second shield 238 typically of a nickel-iron alloy (e.g., ~80/20 at % NiFe, also known as permalloy), first and second writer pole tips 228, 230, and a coil (not shown). The sensor may be of any known type, including those based on MR, GMR, AMR, tunneling magnetoresistance (TMR), etc.

The first and second writer poles 228, 230 may be fabricated from high magnetic moment materials such as ~45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

Figure 4:
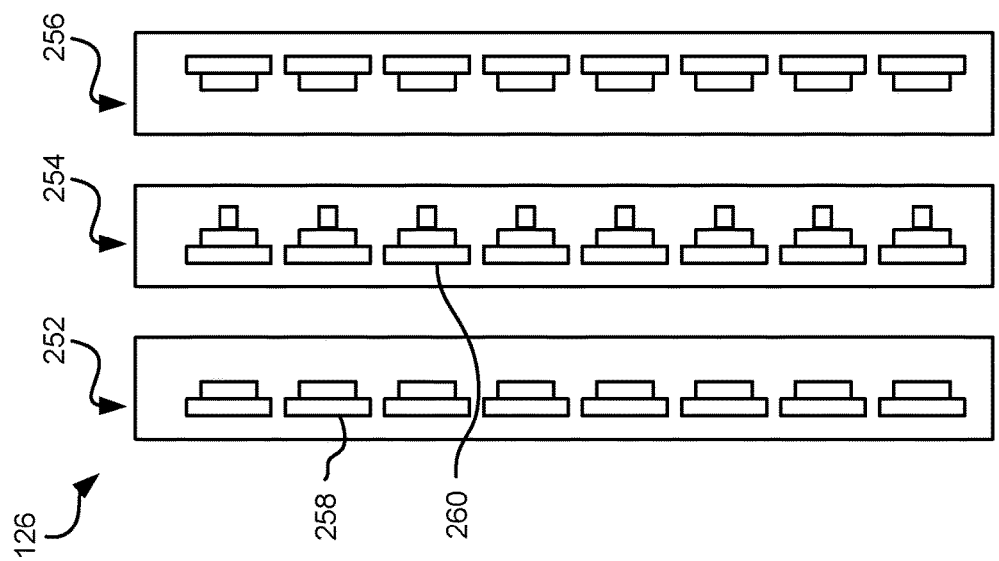
FIG. 4 is a partial tape bearing surface view of a magnetic head having a read-write-read configuration.
Figure 3:
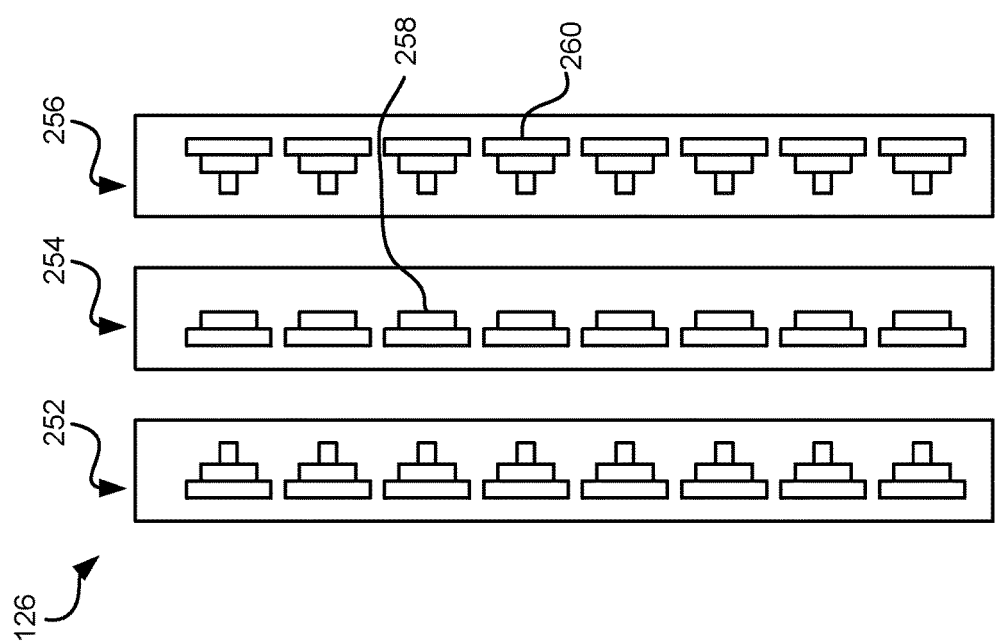
FIG. 3 is a partial tape bearing surface view of a magnetic head having a write-read-write configuration.

The configuration of the tape head 126 according to one embodiment includes multiple modules, preferably three or more. In a write-read-write (W-R-W) head, outer modules for writing flank one or more inner modules for reading. Referring to FIG. 3, depicting a W-R-W configuration, the outer modules 252, 256 each include one or more arrays of writers 260. The inner module 254 of FIG. 3 includes one or more arrays of readers 258 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify embodiments of the present invention. One skilled in the art apprised with the teachings herein will appreciate how permutations of the present invention would apply to configurations other than a W-R-W configuration.

Figure 5:
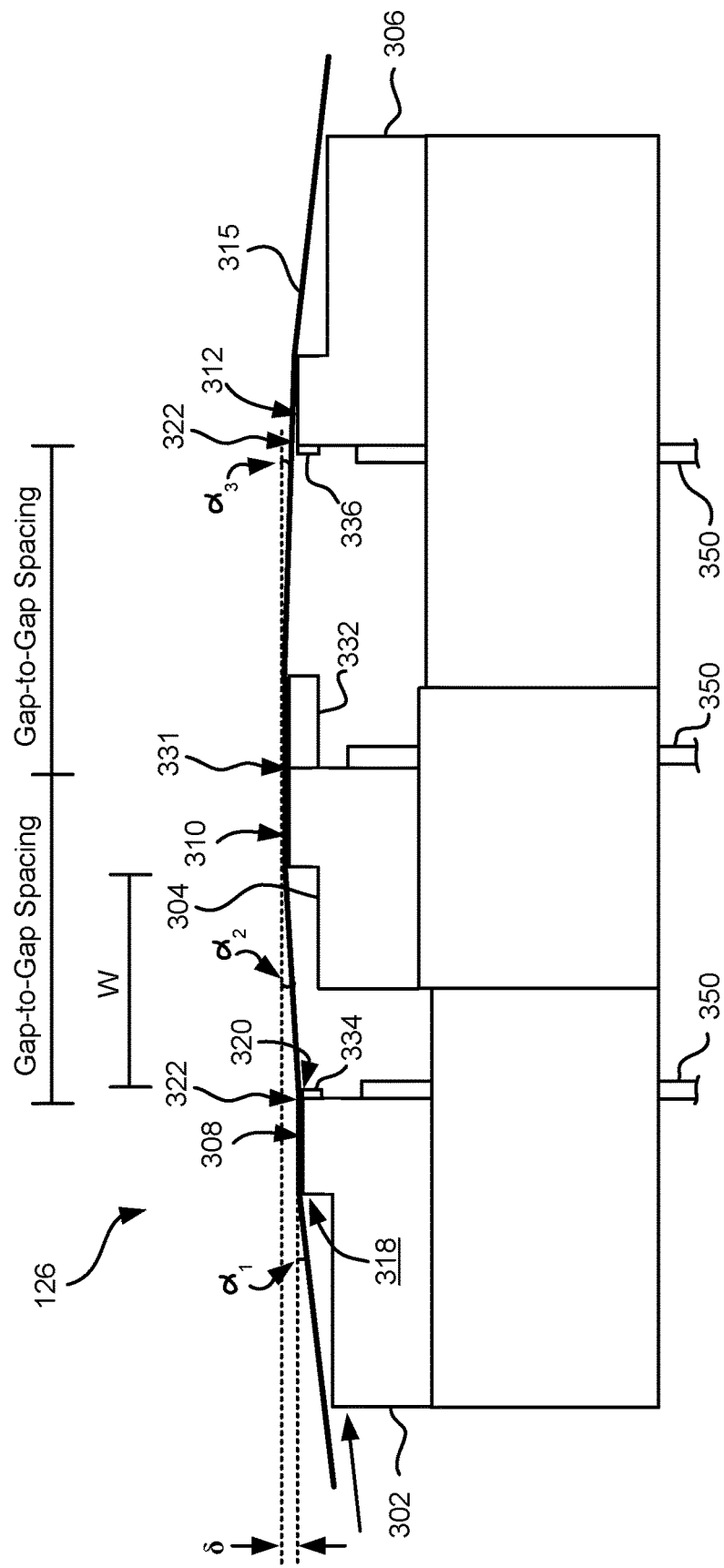
FIG. 5 is a side view of a magnetic tape head with three modules according to one embodiment where the modules all generally lie along about parallel planes.

FIG. 5 illustrates a magnetic head 126 according to one embodiment of the present invention that includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing". The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also note that the outer modules 302, 306 will alternate as leading modules, depending on the direction of travel of the tape 315.

Figure 6:
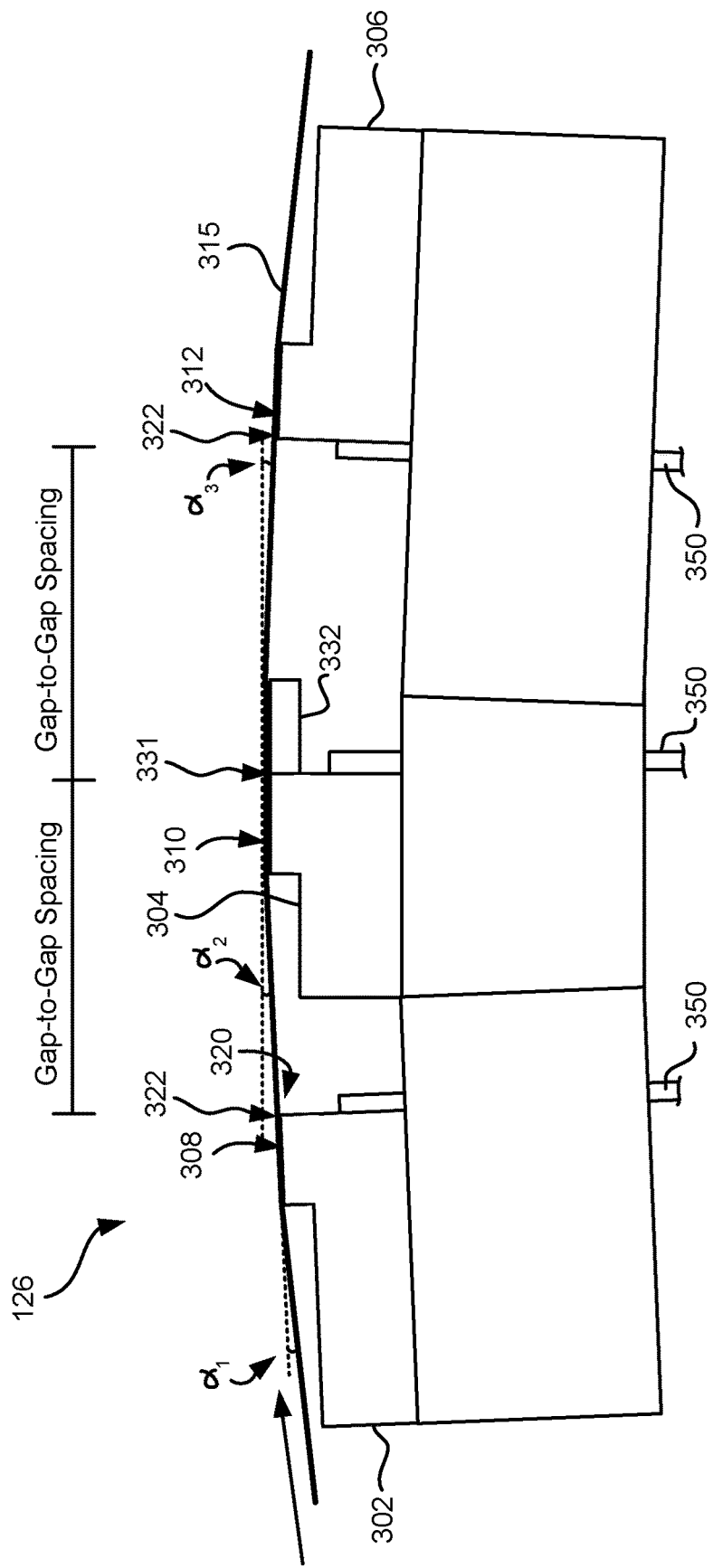
FIG. 6 is a side view of a magnetic tape head with three modules in a tangent (angled) configuration.

In one embodiment, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape bearing surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by the skiving edge 318 of the leading module 302 has been found by experimentation to be sufficient to keep the tape adhered to the tape bearing surface 308 of the leading module 302. The trailing edge 320 of the leading module 302 (the end from which the tape leaves the leading module 302) is the approximate reference point which defines the wrap angle $\alpha_2$ over the tape bearing surface 310 of the second module 304. The tape stays in close proximity to the tape bearing surface until close to the trailing edge 320 of the leading module 302. Accordingly, read and/or write elements 322 may be located near the trailing edges of the outer modules 302, 306. These embodiments are particularly adapted for write-read-write applications.

A benefit of this and other embodiments described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.3° to about 1.1°, though can be any angle required by the design.

Beneficially, the inner wrap angle $\alpha_2$ on the side of the module 304 receiving the tape (leading edge) will be larger than the inner wrap angle $\alpha_3$ on the trailing edge, as the tape 315 rides above the trailing module 306. This difference is generally beneficial as a smaller $\alpha_3$ tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one embodiment, the second module 304 includes a plurality of data and optional servo readers 331 and no writers. The first and third modules 302, 306 include a plurality of writers 322 and no data readers, with the exception that the outer modules 302, 306 may include optional servo readers. The servo readers may be used to position the head during reading and/or writing operations. The servo reader(s) on each module are typically located towards the end of the array of readers or writers.

By having only readers or side by side writers and servo readers in the gap between the substrate and closure, the gap length can be substantially reduced. Typical heads have piggybacked readers and writers, where the writer is formed above each reader. A typical gap is 20-35 microns. However, irregularities on the tape may tend to droop into the gap and create gap erosion. Thus, the smaller the gap is the better. The smaller gap enabled herein exhibits fewer wear related problems.

In some embodiments, the second module 304 has a closure, while the first and third modules 302, 306 do not have a closure. Where there is no closure, preferably a hard coating is added to the module. One preferred coating is diamond-like carbon (DLC).

In the embodiment shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than commonly-used LTO tape head spacing. The open space between the modules 302, 304, 306 can still be set to approximately 0.5 to 0.6 mm, which in some embodiments is ideal for stabilizing tape motion over the second module 304.

Depending on tape tension and stiffness, it may be desirable to angle the tape bearing surfaces of the outer modules relative to the tape bearing surface of the second module. FIG. 6 illustrates an embodiment where the modules 302, 304, 306 are in a tangent or nearly tangent (angled) configuration. Particularly, the tape bearing surfaces of the outer modules 302, 306 are about parallel to the tape at the desired wrap angle $\alpha_2$ of the second module 304. In other words, the planes of the tape bearing surfaces 308, 312 of the outer modules 302, 306 are oriented at about the desired wrap angle $\alpha_2$ of the tape 315 relative to the second module 304. The tape will also pop off of the trailing module 306 in this embodiment, thereby reducing wear on the elements in the trailing module 306. These embodiments are particularly useful for write-read-write applications. Additional aspects of these embodiments are similar to those given above.

Typically, the tape wrap angles may be set about midway between the embodiments shown in FIGS. 5 and 6.

Figure 7:
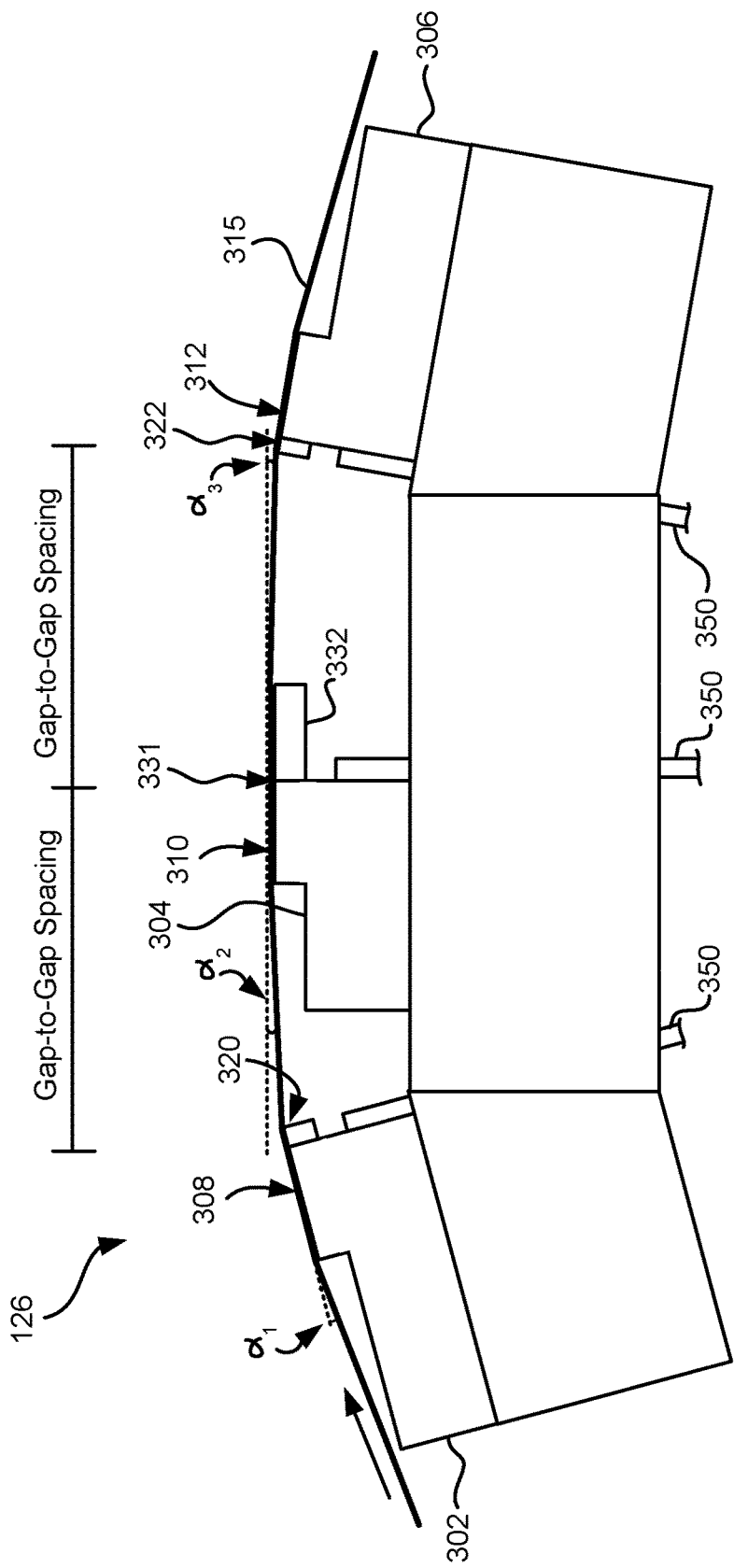
FIG. 7 is a side view of a magnetic tape head with three modules in an overwrap configuration.

FIG. 7 illustrates an embodiment where the modules 302, 304, 306 are in an overwrap configuration. Particularly, the tape bearing surfaces 308, 312 of the outer modules 302, 306 are angled slightly more than the tape 315 when set at the desired wrap angle $\alpha_2$ relative to the second module 304. In this embodiment, the tape does not pop off of the trailing module, allowing it to be used for writing or reading. Accordingly, the leading and middle modules can both perform reading and/or writing functions while the trailing module can read any just-written data. Thus, these embodiments are preferred for write-read-write, read-write-read, and write-write-read applications. In the latter embodiments, closures should be wider than the tape canopies for ensuring read capability. The wider closures may require a wider gap-to-gap separation. Therefore, a preferred embodiment has a write-read-write configuration, which may use shortened closures that thus allow closer gap-to-gap separation.

Additional aspects of the embodiments shown in FIGS. 6 and 7 are similar to those given above.

A 32 channel version of a multi-module head 126 may use cables 350 having leads on the same or smaller pitch as current 16 channel piggyback LTO modules, or alternatively the connections on the module may be organ-keyboarded for a 50% reduction in cable span. Over-under, writing pair unshielded cables may be used for the writers, which may have integrated servo readers.

The outer wrap angles $\alpha_1$ may be set in the drive, such as by guides of any type known in the art, such as adjustable rollers, slides, etc. or alternatively by outriggers, which are integral to the head. For example, rollers having an offset axis may be used to set the wrap angles. The offset axis creates an orbital arc of rotation, allowing precise alignment of the wrap angle $\alpha_1$.

To assemble any of the embodiments described above, conventional u-beam assembly can be used. Accordingly, the mass of the resultant head may be maintained or even reduced relative to heads of previous generations. In other approaches, the modules may be constructed as a unitary body. Those skilled in the art, armed with the present teachings, will appreciate that other known methods of manufacturing such heads may be adapted for use in constructing such heads. Moreover, unless otherwise specified, processes and materials of types known in the art may be adapted for use in various embodiments in conformance with the teachings herein, as would become apparent to one skilled in the art upon reading the present disclosure.

In tape-based storage, as new magnetic recording tape storage products are developed, recording track densities may increase to provide more capacity per unit tape media. As track densities increase, the track following servo may have to perform more efficiently, e.g., with a more finite degree of accuracy, to properly follow the narrower track width(s).

To perform more efficiently, the track following servo system may implement two servo channels, where the servo tracks are positioned just above and below the data band of interest. The two servo channels may be designed to provide identical signals under optimal conditions, such that when one of the servo channel becomes defective, the system continues to perform track following using the remaining servo channel. However, as the magnetic recording tape expands and/or contracts, the distance between the two servo tracks may change, thereby creating some offset in the resulting servo signal. As a result, the servo system typically servos to the middle of the generated offset, e.g., ch1 ch2Offset.

In rare cases, one of the servo signals may have a defect, such as an amplitude spike, which results in a servo-based position value that is far away from where the signal actually should be. In such a case, the servo signal with the defect would in turn corrupt the ch1 ch2Offset, thereby causing the servo system to write off track. This is an undesirable and/or problematic condition because the off track writing will, as a result, likely write over the previously written data, resulting in data losses. Subsequent read operations would end up with a permanent read error as a result of the data losses caused by the over write of data.

Even if the failure case were to be captured and a fix provided, there is no way to effectively verify the fix, because the problem is so rare that it would take product testing potentially many months of running continuously in many environments to recreate the problem case. Moreover, even after such testing, the problem case may potentially not be recreated, as would be useful for verifying and/or testing a fix.

Embodiments described herein enable generating the rare servo signal failure case that was captured e.g., so that failure analysis can be performed, so that solution(s) to avoid such defects can be developed, so that the developed solution(s) may be verified, etc. Additionally, many months of testing, and expended man/woman power that would otherwise be needed in attempting to recreate the rare problem are no longer needed.

An illustrative servo signal with an amplitude spike is shown in plot 800 of FIG. 8 for purposes of an illustrative example, and will now be described below.

Figure 8:
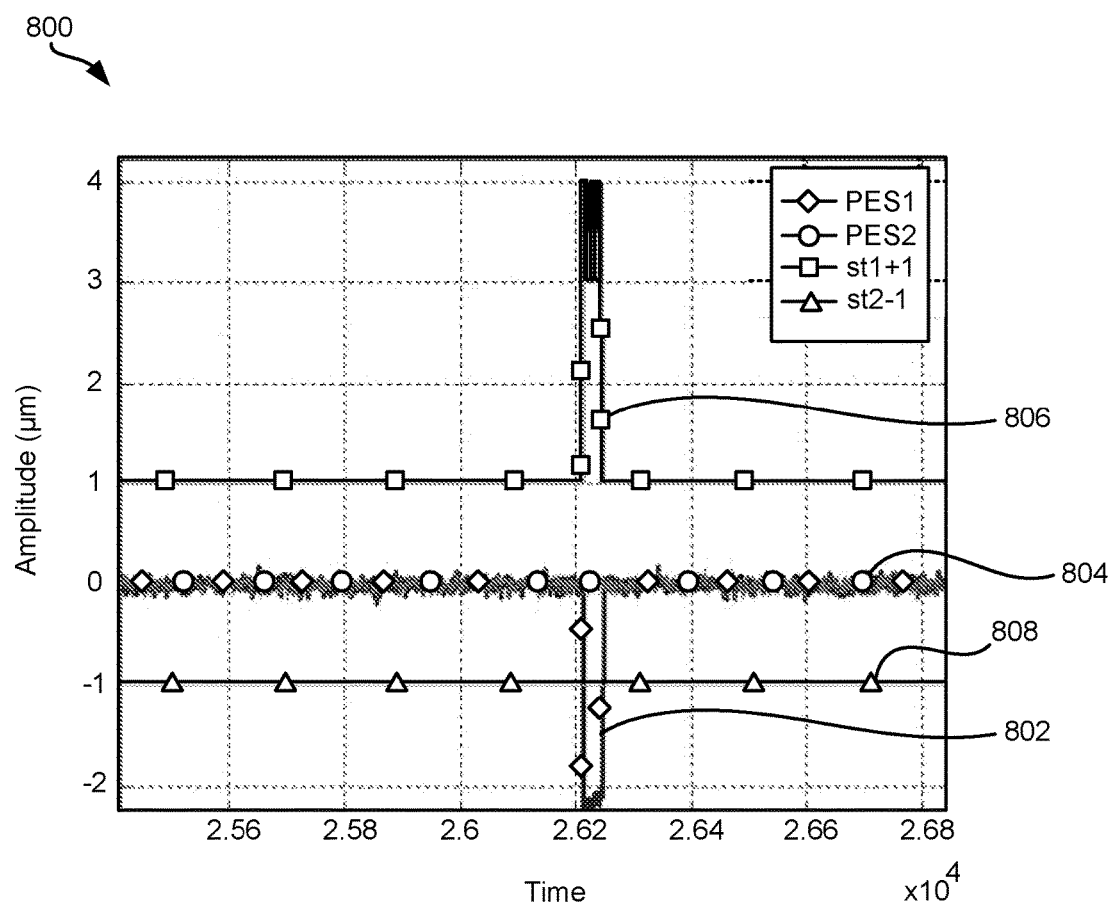
FIG. 8 illustrates a time versus amplitude plot of servo signals, in accordance with one embodiment.

FIG. 8 depicts a servo signal plot 800, in accordance with one embodiment. As an option, the present plot 800 may be implemented in conjunction with features from any other embodiment listed herein, such as those described with reference to the other FIGS. Of course, however, such plot 800 and others presented herein may be used in various applications and/or in permutations which may or may not be specifically described in the illustrative embodiments listed herein. Further, the plot 800 presented herein may be used in any desired environment.

Plot 800 includes a time (x-axis) versus amplitude (y-axis) plotting of two servo signals, e.g., a first servo signal 802 and a second servo signal 804. The first servo signal 802 is represented by PES1 in the plot legend, while the second servo signal 804 is represented by PES2.

The first servo signal 802 includes a typical defect (described above), where the first servo signal 802 spikes downward from the zero of the y-axis of plot 800 at around the time $2.62 \times 10^4$. The amplitude of the downward defect spike measures about 2 μm.

In contrast, the second servo signal 804 remains along the zero of the y-axis of plot 800, without a defect.

According to one embodiment, a spike detect function may be implemented to detect defects such as the defect of the first servo signal 802 of channel 1. When a status of each servo signal 802, 804 has status=OK (normal), the average of the servo signals is established and use as a reference (Ref1). The servo signals are then compared to the Ref1 value during operation. When a servo signal is compared to Ref1 and the amplitude difference is above some predefined threshold of any suitable value, such as 1 μm, a spike is detected. In response to detecting the spike, the status line 806 will be modified to: status=Spike (spike) indicating the corresponding servo signal 802 is bad. The servo system then stops using the first servo signal 802. Also, the system will no longer use the bad servo signal 802 to update the average reference (Ref1).

In response to determining that the first servo signal 802 of channel 1 is bad/defective, the servo system may use a different servo signal signal/channel to continue track following, e.g. such as the second servo signal 804 channel 2 (PES2) which does not include a defect.

The channel 1 and channel 2 offset (ch1 ch2Offset) may also be generated in some approaches. For example the Ch1ch2Offset may be calculated using the formula Ch1ch2Offset=(accumulate 32 difference)/32, where accumulate "accumulate 32 difference" is the sum of thirty-two separate differences of reference points along the servo channels, where the difference in the channels may be found by subtracting a channel 2 value from a channel 1 value (ch1−ch2).

It should be noted that the Ch1ch2Offset may cease to be calculated in response to the status indicating that a servo channel includes a spike, e.g., so as to not incorporate the defective signal into the Ch1ch2Offset calculation. According to one embodiment, the Ch1ch2Offset may be calculated at any time prior to the status indicating that a servo channel includes a spike.

Plot 800 also includes status servo signals, e.g. a first status servo signal 806 and a second status servo signal 808. In plot 800, the status signals have the following encoded values: 0=ok, 1=old data, 2=invalid, 3=spike. Also, instead of plotting all signals on the 0 scale, which very hard to see since most signal will lie on top of each other, these status signals will be plotted with an offset. The first status servo signal 806 is plotted with an offset of +1 as noted by the line st1+1 in the legend of plot 800, it has a similar plot pattern as the first servo signal 802, e.g., includes a defect spike at around the time $2.62 \times 10^4$; the first status servo signal 806 also has values of 2 and 3 meaning it is invalid and/or spike detected.

Likewise, the second status servo signal 808 has a similar plot pattern as the second servo signal 804, however in contrast, the second status servo signal 808 is offset a value of −1 μm from the zero of the y-axis of plot 800, as noted by the line formula st2-1 of the second status servo signal 808 in the legend of plot 800.

A spike detect function, such as the one described above, may be implemented to detect a defect of a servo signal where the defect occurs at some point in time after time $0 \times 10^4$. For example, the defect of the first servo signal 802 was able to be detected because, prior to time $2.62 \times 10^4$, the first servo signal 802 was centered about the zero of the y-axis.

A problem arises, however, when a spike in a servo signal occurs during the servo lock process. Particularly, the spike detect function may not be able to detect a defect of a servo signal when the defect (e.g., amplitude spike) occurs during the time in which first servo channel and/or second servo channel is acquiring a lock on a servo track. This is because the signal of the acquire lock process is always assumed to start out with a good signal, which may be used to establish a good reference. The established reference may be used to discriminate defects, such as spikes. Therefore, when the assumption is wrong, the signal of the acquire lock process starts out as a defective signal, but this signal is not known to be defective. In response to using this bad signal to establish the reference, later when the signal returns to a good signal, the good signal is different from the reference and incorrectly deemed a bad signal. An illustrative example of a servo signal defect occurring during servo track locking is described below, e.g., see FIG. 9.

Figure 9:
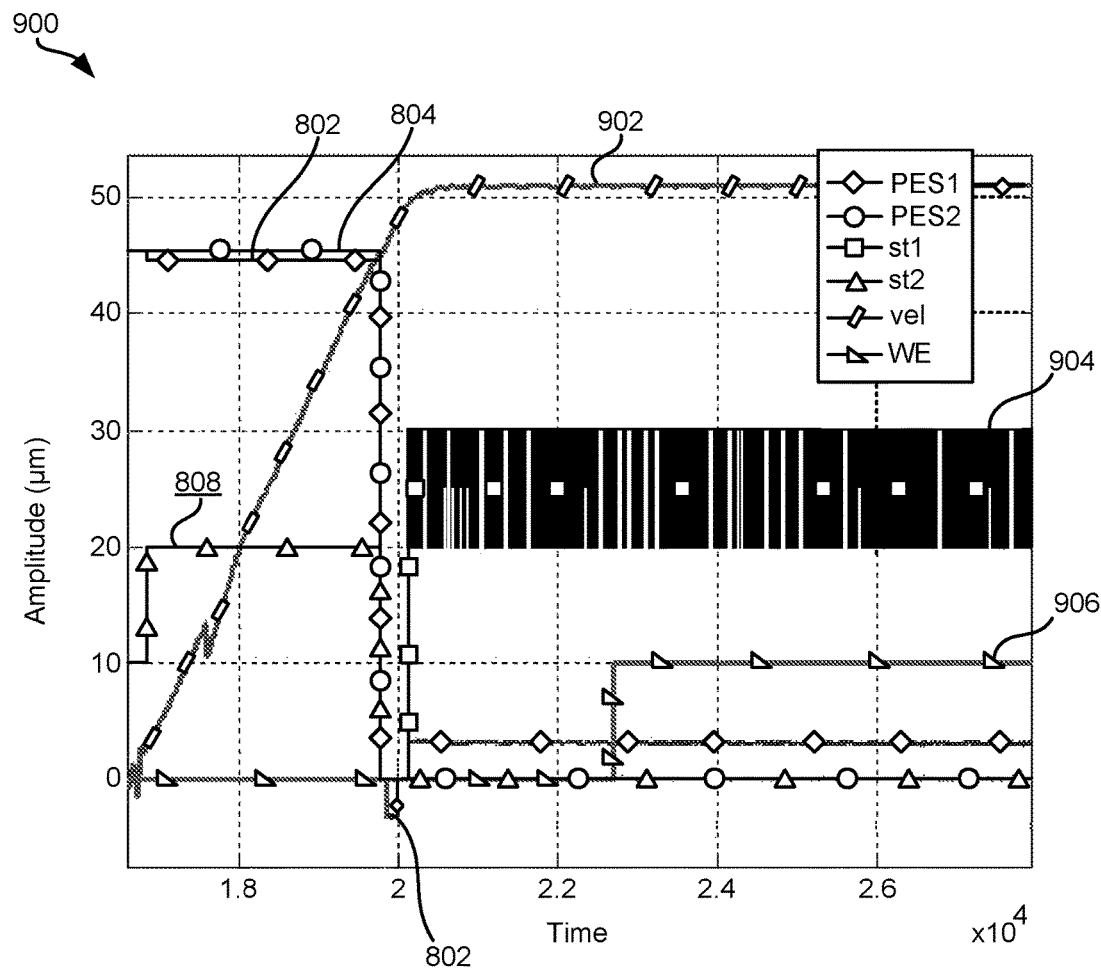
FIG. 9 illustrates a time versus amplitude plot of servo signals, in accordance with one embodiment.

FIG. 9 depicts a servo signal plot 900, in accordance with one embodiment. As an option, the present plot 900 may be implemented in conjunction with features from any other embodiment listed herein, such as those described with reference to the other FIGS. Of course, however, such plot 900 and others presented herein may be used in various applications and/or in permutations which may or may not be specifically described in the illustrative embodiments listed herein. Further, the plot 900 presented herein may be used in any desired environment.

In plot 900, an amplitude spike of the first servo signal 802 occurs during servo track locking, from around the time $1.98 \times 10^4$ to around the time $2.0 \times 10^4$. The amplitude spike of the first servo signal 802 extends to −4 μm in plot 900. The acquiring track lock may occur according to one embodiment prior to a write enable 906 ("WE" in plot 900 legend) activated, e.g., see write enable activated at around the time $2.26 \times 10^4$.

The amplitude spike of the first servo signal 802 occurs in the present illustrative plot as a velocity 902 of the tape drive is increasing, e.g., the drive is "spinning up."

Since the spike happened at the very beginning of the servo signal, the occurrence of the spike is unknown, and the signal is assumed to be "good." Additionally, the status signal st1 remains at 0 which means that the servo signal is acceptable to use. The amplitude spike of the first servo signal 802 occurring prior to the write enable turning on and/or during the acquiring track lock, the first servo signal 802 of channel 1 locks to what it believes to be the zero of the amplitude axis, which is actually an offset at −4 μm of the amplitude axis. As a result of the first servo signal 802 of channel 1 locking to −4 μm of the amplitude axis. This locking happened at about the time $2.0 \times 10^4$, as can be seen when signal 802 moves to 0 um. At about the time $2.01 \times 10^4$, the signal returns to normal, however the reference has been established with a spike signal so now the normal signal is treated as spiked, which is indicated by status signal st1 904 having values of 2 and/or 3, meaning spike, invalid. Also, this return to a normal value makes the servo signal jump from a value of 0 to a value of about 4 μm. When the write enable 906 is activated around the time $2.26 \times 10^4$, the first servo signal 802 plots at an amplitude of +4 μm, rather than an amplitude of 0 μm. As mentioned above, the first and second servo signals 802, 804 may be averaged to establish a servo reference position. This in turn will undesirably cause off track writing. Furthermore, although the second servo signal 804 has an amplitude of 0 μm for the duration of the write enable 906 being active, the second servo signal 804 will not be selected for use as an alternative to the defective first servo signal 802, because the lock to the improper offset by the first servo channel is unknown.

The resulting data overwrite is thus typically not detectable until an attempt is made to read back the overwritten data.

In order to assist in creation of algorithms to detect servo signal defects, various embodiments enable simulation of servo signal failures/defects in a time based servo system, as will be described below, e.g., see method 1000. Such a simulation may be performed by the controller of a tape data storage drive, e.g., using implemented software and/or firmware.

Figure 10:
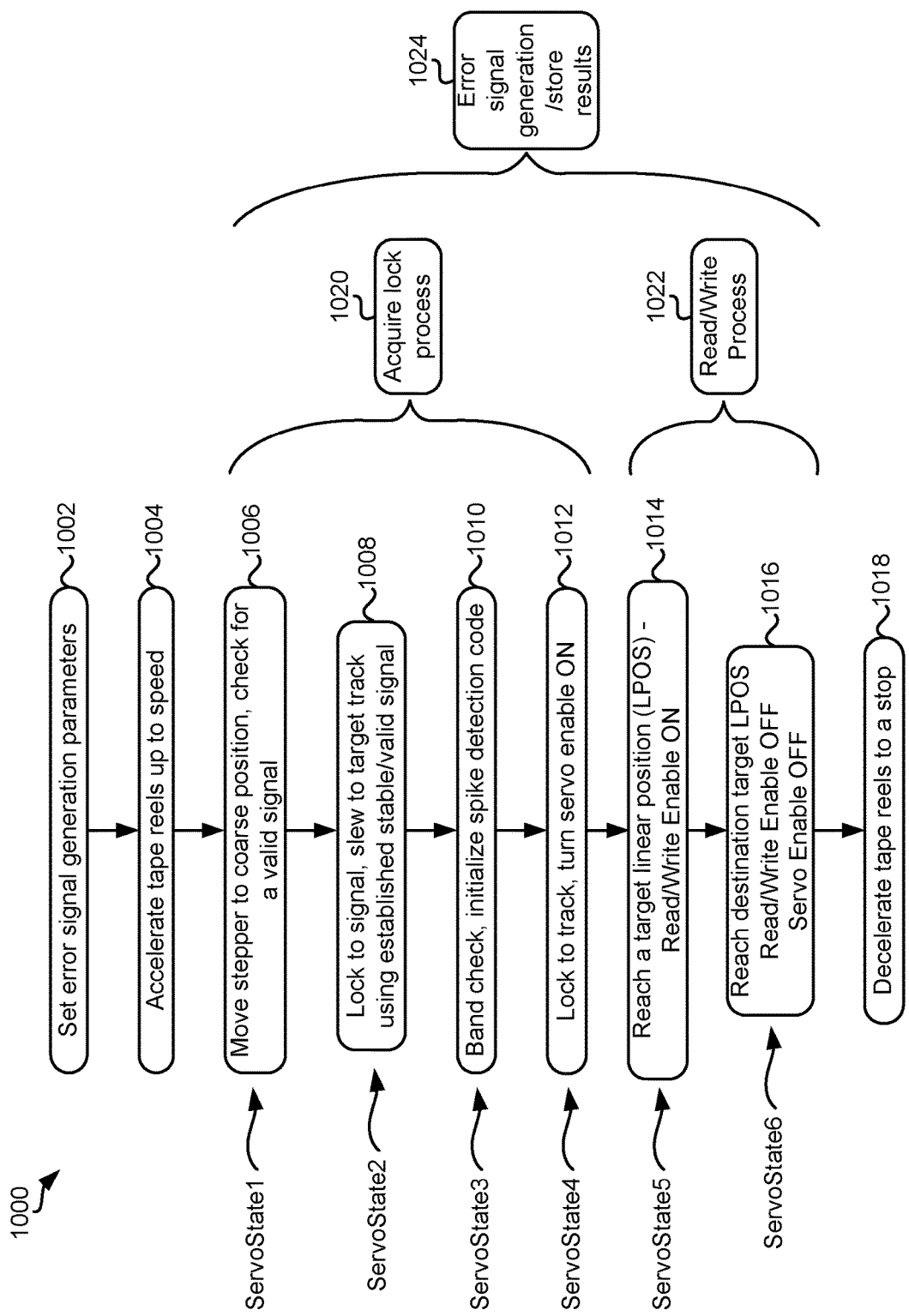
FIG. 10 illustrates a flowchart of a method, in accordance with one embodiment.

Now referring to FIG. 10, a flowchart of a method 1000 is shown according to one embodiment. The method 1000 may be performed in accordance with the present invention in any of the environments depicted in FIGS. 1-7, among others, in various embodiments. Of course, more or less operations than those specifically described in FIG. 10 may be included in method 1000, as would be understood by one of skill in the art upon reading the present descriptions.

Each of the steps of the method 1000 may be performed by any suitable component of the operating environment. The controller, e.g., processing circuit(s), chip(s), and/or module(s) implemented in hardware and/or software, and preferably having at least one hardware component may be utilized in any device to perform one or more steps of the method 1000. Illustrative controllers include, but are not limited to, a central processing unit (CPU), an application specific integrated circuit (ASIC), a field programmable gate array (FPGA), etc., combinations thereof, or any other suitable computing device known in the art.

Operation 1002 of method 1000 includes setting error signal generation parameters, e.g., to generate a servo signal amplitude spike. The error signal generation parameters may specify characteristics of such servo signal amplitude error that is simulated in one or more of the servo channels. Such a simulation may be performed by the controller of a tape data storage drive, e.g., using implemented software and/or firmware.

The simulation may set up to re-create known signal spike errors, e.g., so that a fix may be generated, and offset track writing may be avoided thereafter. However, simulated servo error signals of any type may be created for any desired purpose.

The error signal generation parameters may come from any suitable source. In one approach, one or more of the signal generation parameters may be received from a user. In another approach, one or more of the signal generation parameters may be selected from a table of parameters. In yet another approach, one or more of the signal generation parameters may be received from a host, external controller, etc. In yet another approach, one or more of the signal generation parameters may be determined by a processor of the device performing method 1000.

According to one embodiment, setting error signal generation parameters may include determining a start position for a spike, where the spike may represent any type of error. The start position of the spike may be designated at any point in an acquire lock process 1020 and/or at any point in a read and/or write process 1022. The start position designates a position, e.g., a time during method 1000, that the servo signal will start spiking.

Setting error signal generation parameters may also and/or alternatively include determining an end position for the spike. The determined end position for the spike may be used to determine the duration of time and place in time that the spike is active.

Setting error signal generation parameters may also and/or alternatively include determining a servo channel, e.g., for the spike to occur on. For example, referring again to FIGS. 8-9 which include the first servo signal 802 of servo channel 1 and the second servo signal 804 of the servo channel 2, the servo channel on which the spike will occur may be determined to be servo channel 1 and/or servo channel 2.

Setting error signal generation parameters may also and/or alternatively include setting an amplitude of the spike. The amplitude of the spike may vary depending on the embodiment, but preferably may be larger than an amplitude that might otherwise be close to the amplitude of a non-spiking servo signal. Setting the spike amplitude to be greater than an amplitude of a non-spiking servo signal may allow a controller and/or processor logic performing method 1000 to differentiate between the two amplitudes, e.g., when analyzing a fix for the recreated spike defect.

Setting error signal generation parameters may also and/ or alternatively include setting a number of repetitions that the spike is to be generated.

In some embodiments, sets of parameters may be set to create multiple spikes of different character from one another.

Operation 1004 of method 1000 includes accelerating tape reels up to speed, e.g., read/write operating speeds. Although the tape reels may be accelerated up to speed at any time during method 1000, according to some embodiments, accelerating tape reels may be performed gradually over a period of time, e.g., to be gentle with operational components of a tape drive that performs method 1000.

Operation 1006 of method 1000 includes moving a stepper to a coarse position, e.g., to check for a valid signal. Moving the stepper to a coarse position may align one or more components of a servo drive to lock and or align with a particular target track.

Operation 1006 may be one of a plurality of operations of an acquire lock process 1020. Accordingly, operation 1006 may be performed in response to an acquire lock process being initiated. According to one embodiment, as illustrated in FIG. 10, the acquire lock process 1020 of method 1000 may include at least four operations, e.g., operations 1006-1012 (described below), any of which may use known methods for performing the desired function. According to one approach, performing the acquire lock process may take a very short amount of time, e.g., typically about 40-60 milli-seconds.

It should also be noted that operations 1006, 1008, 1010, 1012 may correspond to servo states: ServoState1, ServoState2, ServoState3, ServoState4 (respectively). The servo states of the operations will be used in the illustrative examples of method 1000, e.g., see FIGS. 11A-12B.

Operation 1008 of method 1000 includes locking to the signal (the signal that was established to be valid), and slewing to the target servo track using the established stable/valid signal. Slewing to the target track may be performed using known track following processes, e.g., to maintain accurate read/write performance(s).

Operation 1010 of method 1000 includes checking which data band that corresponds to the target track of data. Operation 1010 may include initializing spike detection code, e.g., of the type discussed with reference to FIGS. 8-9. The spike detection code may cause a servo channel to begin monitoring for servo signal spikes. The servo channel may, for example, detect the created servo signal spike (parameters of the spike set in operation 1002).

Operation 1012 of method 1000 includes completing the lock to the target servo track. Allowing data channels to read/write data when reaching a linear target position may include selecting a lateral position on the tape to lock to in response to one or more of the acquiring lock process 1020 operations being performed. In response to the data track being locked to, the servo enable may be selected on.

Operation 1014 of method 1000 includes reaching a target linear position (LPOS) on the tape of the tape data storage drive. The linear position along the tape may be determined using known methods, such as via reading LPOS encoding in the servo track. According to one embodiment, the target LPOS may be any location on the tape.

Operation 1014 may also and/or alternatively include turning a read/write enable on. The read/write enable may be turned on in response to the servo enable being turned on, e.g., where the servo enable turning on corresponds to the servo system being ready to enable read and/or write operations in the proper data tracks. In response to the read/write enable being turned on, a read and/or write function may be performed on the tape.

Operation 1014 may be one of a plurality of operations of a read/write process 1022. Accordingly, operation 1014 may be performed in response to a target LPOS being reached. As illustrated in FIG. 10, the read/write process 1022 of method 1000 includes operations 1014-1016 (described below). It should be noted that the read/write process 1022 may include a read and/or a write process.

Operation 1016 of method 1000 includes reaching a destination target LPOS on the tape. In response to reaching the destination LPOS on the tape, the Read/Write Enable and/or the Servo Enable may be turned off.

It should be noted that operations 1014, 1016 may correspond to servo states: ServoState5, ServoState6 (respectively). The servo states of the operations will be used in the illustrative examples of method 1000, e.g., see FIGS. 11A-12B.

Operation 1018 of method 1000 includes decelerating the tape reels to a stop. The tape reels may be decelerated to a stop in response to read/write requests no longer residing in a queue of the servo system performing method 1000. Similar to accelerating the tape reels, decelerating the tape reels may include ramping the tape reel speeds down gradually.

As discussed in more detail below, operation 1024 includes introducing a spike (error signal) in any of operations 1006-1016 to create a spike according to the parameters set in operation 1002. This spike, and the resulting effect on the servo system, may be used for a variety of purposes such as recreating error conditions, developing spike detection code and/or countermeasures, etc. For example, a spike may be generated to assist developers in finding ways to diagnose and/or create solutions for the following problem that occurs during normal tape drive operation. As mentioned above with reference to FIG. 9, during a normal read/write process implementing operations like 1004-1018 of FIG. 10, when a spike occurs during the acquire lock process 1020, a stable reference (REF1) may be inadvertently set at the wrong position, such as when a spike signal occurs before the spike detection code can detect presence of the spike, e.g., when locking to the signal. See, e.g., FIG. 9, where the spike occurs during the acquire lock process. At this same time, the ch1 ch2Offset is also being established using the spike signal, and therefore will similarly be offset from the proper position. For example, a "good" signal may be compared to the "spiked Ref1." In response to determining that the difference between the two compared "bad" and "good" signals is more than 1 µm, the status of the servo signal may be changed to "Spike" which may represent that a spike has been detected. The "Spike" status may prevent the ch1 ch2Offset from updating and thus the ch1ch2Offset may be stuck at the bad spiked level. When the writing target LPOS is reached, the writing process may begin and thereby write with a bad ch1 ch2Offset. This may result in writing off track without knowing it. The result is potentially overwriting existing data.

It is rare that a spike happens during the tiny amount of time when the drive is establishing it reference. In fact, it is such a rare condition that it has been found to take a test group many months of running tests just to get one incident to occur. Therefore, it has heretofore been impossible to create a correction for early-occurring spike due to the inability to recreate the problem.

However, method 1000 enables creation of such a spike at will. This allows developers to design countermeasures for such spikes, as well as verify that a proposed solution can alleviate the problem.

Referring again to operation 1024, the spike may be created in any servo-related operations, which in method 1000 includes operations 1006-1016. The spike may have the parameters set in operation 1002, e.g., the specified start and stop times, the specified amplitude, the specified number of repetitions, any other parameters set in operation 1002, etc.

According to one embodiment, the spike may be created during the acquire lock process 1020. Creating the spike during the acquire lock process 1020 and storing the results of how the servo channel(s) operate thereafter may provide predefined spikes to a testing sequence that in turn may be used to create a fix that prevents off track writing as a result of servo locking during a servo signal spike.

According to another embodiment, the spike may be created during a data process. According to one approach, the spike may be created during the read/write process 1022.

Method 1000 may also and/or alternatively include storing servo data including at least a portion thereof generated during the spike. According to one embodiment, the servo data may be stored on a memory module in a servo system or controller that is performing method 1000. Storing servo data including at least a portion thereof generated during the spike may allow a design fix to be generated that would prevent locking to in-use (non-created) servo signal spikes thereafter. The designed fix may be verified in testing, by repeating method 1000 to generate the spike and/or other permutations thereof, to ensure that the fix is adequate.

According to another embodiment, the servo data may additionally and/or alternatively be exported to a different memory device. According to one approach the servo data may be exported to another device via a hardwire leading from the device on which method 1000 is being performed. According to another approach, the servo data may be wirelessly exported via an established wireless connection to another device.

Servo signal spikes may be created anywhere in the acquire lock process 1020 and/or the read/write process 1022. The spike may be fired as a single spike or in repetition as a plurality of spikes. Amplitude and duration parameters of the spikes may be set with simple issued serial command(s). Examples of setting spike parameters and illustrative plots of the created spikes are described below, e.g., see FIGS. 11A-12B.

Figure 11A:
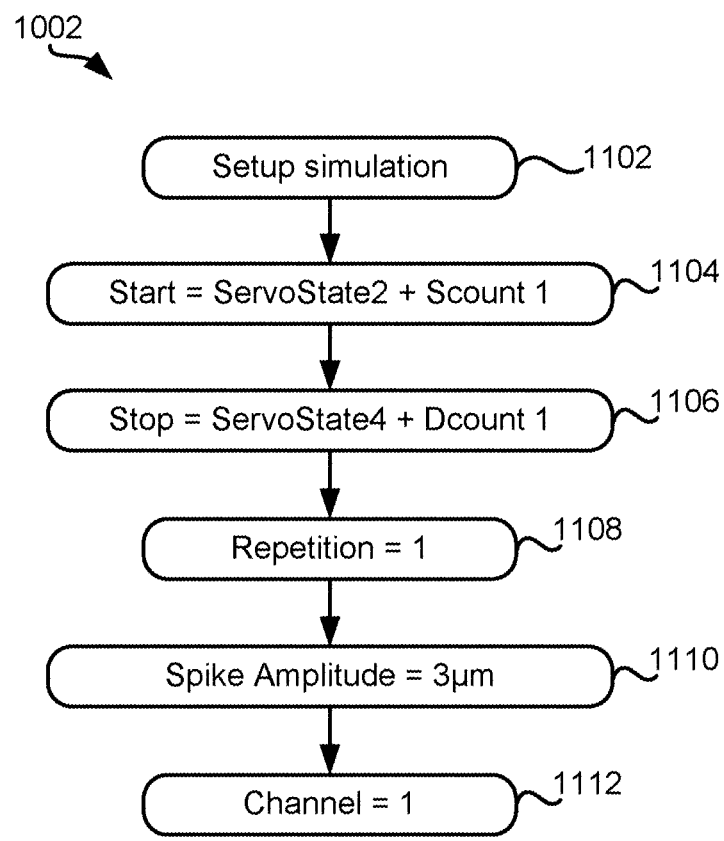
FIG. 11A illustrates an operation of the method of FIG. 10, with sub-operations for setting parameters of a servo signal spike, in accordance with one embodiment.

Referring to FIG. 11A, operation 1002 includes setting parameters for generating a single spike during the acquire lock process 1020 of FIG. 10 from ServoState2 to ServoState4. Operation 1002 may include any one or more of the sub-operations illustrated therein, as well as others.

With continued reference to FIG. 11A, sub-operation 1102 includes setting up a simulation, e.g., a simulation that creates and/or plots at least one servo signal spike. According to another embodiment, setting up a simulation may include receiving, e.g., from a user, database, table, etc., specification of parameters of the spike simulation, e.g., see selected parameters in operations 1104-1112. For example, an interface for receiving the various parameters may be output to a user.

Sub-operation 1104 includes determining a start position for the spike. In this example, the start position of the spike is determined to be during the acquire lock process, and in which state of the acquire lock process to start the spike. Particularly the start location is during ServoState2, which referring back to FIG. 10 occurs during a locking to signal operation, e.g., operation 1008, during the acquire lock process 1020.

Sub-operation 1104 may also and/or alternatively include determining a sample count (Scount) in the determined state of the acquire lock process for the start position of the spike. The sample count may be any desired number of samples. For example, if the spike is to start right at the beginning of ServoState2, Scount may be set to zero. If the spike is to start two samples after the beginning of ServoState2, then Scount may be set to 2. In the present example, the determined sample count in the determined state of the acquire lock process for the start position of the spike is one sample count into ServoState2, as noted by "Scount 1." According to one approach, each sample may be around 30-70 µs.

Referring again to FIG. 11A, sub-operation 1106 includes determining a duration of the spike, e.g., by setting a "Stop" parameter for the spike that defines when the spike ends. According to some embodiments sub-operation 1106 may include determining a state of the acquire lock process for the end position of the spike (Stop). The state for the end position of the spike may any state of the acquire lock process. According to one approach, as illustrated in FIG. 11A, the end position of the spike may be "ServoState4" which, referring back to method 1000 may correspond to performing a lock to track and/or turning the servo enable "ON".

The duration of the spike is illustrated in the present example as extending from its start point set in operation 1104 to one sample count (Dcount 1) into ServoState4.

The state at which the spike may be stopped may be the same servo state that the spike starts in. For example, if the spike is to start and end in ServoState2, the stop position may be designated by ServoState2+Dcount #, where # is the number of cycles that the spike will be applied, i.e., the duration of the spike.

To provide a further example, according to other embodiments, if the duration count is set to ten and the stop servo state set to servo state four (Stop=ServoSate4+Dcount 10), instead of the spike stopping right at servo state 4, the spike would stop at ServoState4+10 samples.

Figure 11B:
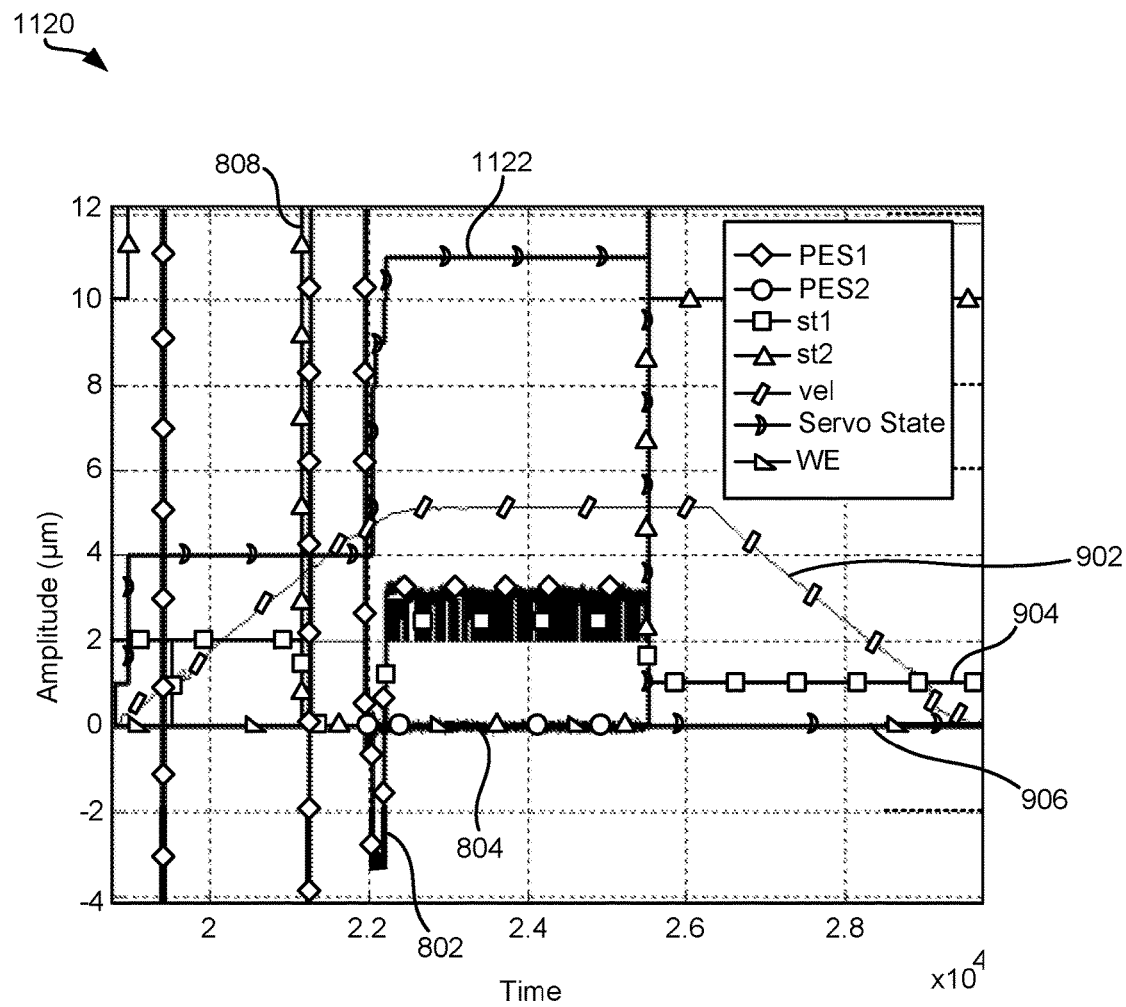
FIG. 11B illustrates a time versus amplitude plot of a created servo signal spike that is characterized by the parameters set in FIG. 11A, in accordance with one embodiment.

Sub-operation 1108 of operation 1002 includes determining a number of times to repeat the spike. Although the example of FIGS. 11A-11B illustrate the spike occurring only one time, the creation of the spike may be repeated more than one time.

Sub-operation 1110 of operation 1002 includes setting an amplitude of the spike. According to the present example, the spike amplitude is set to be 3 µm, though any desired value may be used.

Sub-operation 1112 of operation 1002 includes setting a channel on which the spike will be created. In the present example, the spike is set to be created on channel 1. In other embodiments, the spike may be set to be created on channel 2, or any other servo channel.

Once the spike parameters are set, the method 1000 of FIG. 10 may be performed, and the error signal generation operation 1024 may generate the spike or spikes according to the parameters.

A plotting of a created spike with the parameters set in FIG. 11A will now be described below.

FIG. 11B depicts a servo signal plot 1120, in accordance with one embodiment. As an option, the present plot 1120 may be implemented in conjunction with features from any other embodiment listed herein, such as those described with reference to the other FIGS. Of course, however, such plot 1120 and others presented herein may be used in various applications and/or in permutations which may or may not be specifically described in the illustrative embodiments listed herein. Further, the plot 1120 presented herein may be used in any desired environment.

Referring now to FIG. 11B, the plot 1120 illustrates a first servo signal 802 (which corresponds to servo channel 1 as specified in operation 1112 or FIG. 11A). The first servo signal 802 includes a spike created with the illustrative parameters as set in the operations of FIG. 11A.

Upon initiation, the velocity (vel) of the tape reels is illustrated as accelerating up to speed in plot 1120 in the approximate time period of $1.9 \times 10^4$ to $2.2 \times 10^4$, which is prior to a spike being created in servo channel 1, and thereby applied to the first servo signal 802.

At about $2.2 \times 10^4$, the Servo State changes to ServoSate2. In accordance with the parameters set in sub-operation 1104 of FIG. 11A, the spike is applied to the first servo signal 802 at a sample count of one.

The spike continues until the stop parameter set in sub-operation 1106 of FIG. 11A, namely ServoSate4 plus one sample count, which in the plot 1120 occurs at about time $2.21 \times 10^4$. The spike is generated only one time in response to one being the determined number of times for the spike to be repeated (see sub-operation 1108 of FIG. 11A).

The spike according to the present example parameters is generated during a locking a signal operation, e.g., see ServoState2 in FIG. 10. As noted above, if such a spike occurs during this time period in servo channel 1 during normal use, servo channel 1 might lock to the wrong servo position. This is exemplified by signal PES1 in chart 1120 being offset from 0 by an amplitude approximately equal to the amplitude of the spike.

In the example shown in FIGS. 11A and 11B, because the spike duration extended through ServoState3, which included initialization of the spike detection code (see operation 1010 of FIG. 10), the created spike caused the servo signal status to indicate the detection of a "Spike" or "Invalid." In response to the servo signal status indicating the detection of a "Spike" or "Invalid," when the servo system reached ServoState5, which corresponds to the target LPOS being reached (see operation 1014 of FIG. 10), the write enable signal (WE) 906 remained off to thereby preventing off track writing. This verified that the spike detection code was functioning properly.

Figure 12A:
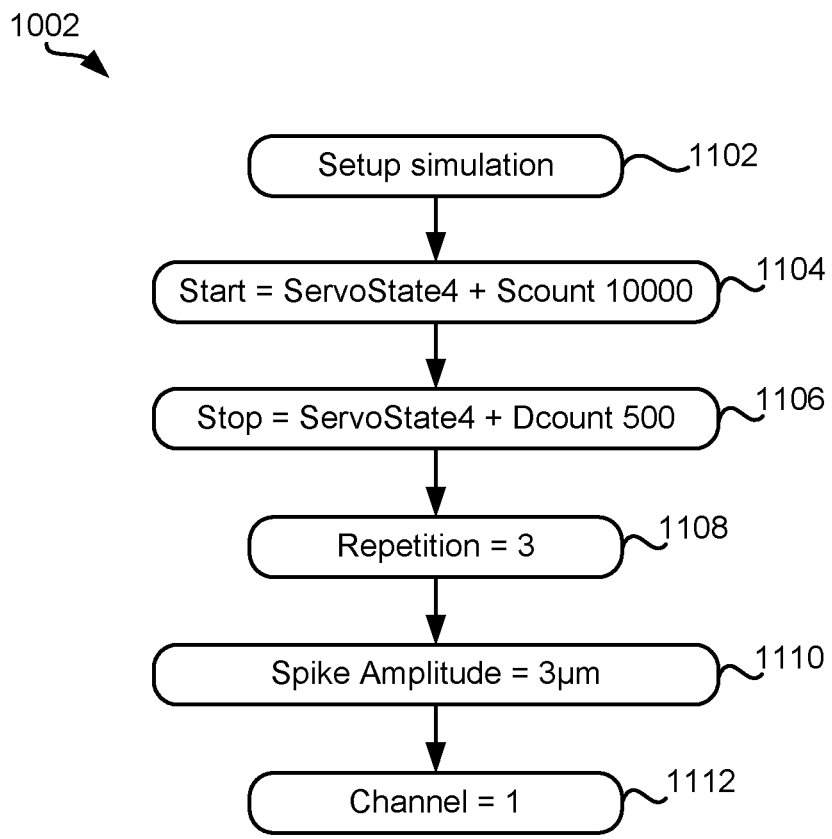
FIG. 12A illustrates an operation of the method of FIG. 10, with sub-operations for setting parameters of a servo signal spike, in accordance with one embodiment.

Referring now to FIG. 12A, operation 1002 is illustrated to include setting parameters for generating three spikes during an acquire lock process.

It should be noted that operation 1002 of FIG. 12A includes similar operations as operation 1002 of FIG. 11A, however some of the parameters of operation 1002 of FIG. 12A are set to different with different values. For example, the spike generation is to be repeated three times, as noted in operation 1108.

In this example, sub-operation 1104 of operation 1002 includes determining a start position for the first spike to be in ServoState4. The sample count of sub-operation 1104 is set to be 10,000 samples. Accordingly, the first spike will start during ServoState4 at sample count 10,000.

Referring to sub-operation 1106, the first spike is set to end during ServoState4. The spikes are also set to have a duration of 500 counts, whereby the first generated spike would end during ServoState4 at sample count 10,500.

Also, referring to sub-operation 1108 of operation 1002, the determined number of times to repeat the spike is set to be three. Accordingly, the second spike will start 10000 counts (Scount) after the first spike ends, and have a duration (Dcount) of 500 counts.

In the present example, each of the three spikes are set to have an amplitude of 3 μm. See operation 1110.

It should be noted that where more than one spike is created, the amplitudes, positions, durations, etc. of the spikes may be made to vary by setting parameters for additional spikes.

Figure 12B:
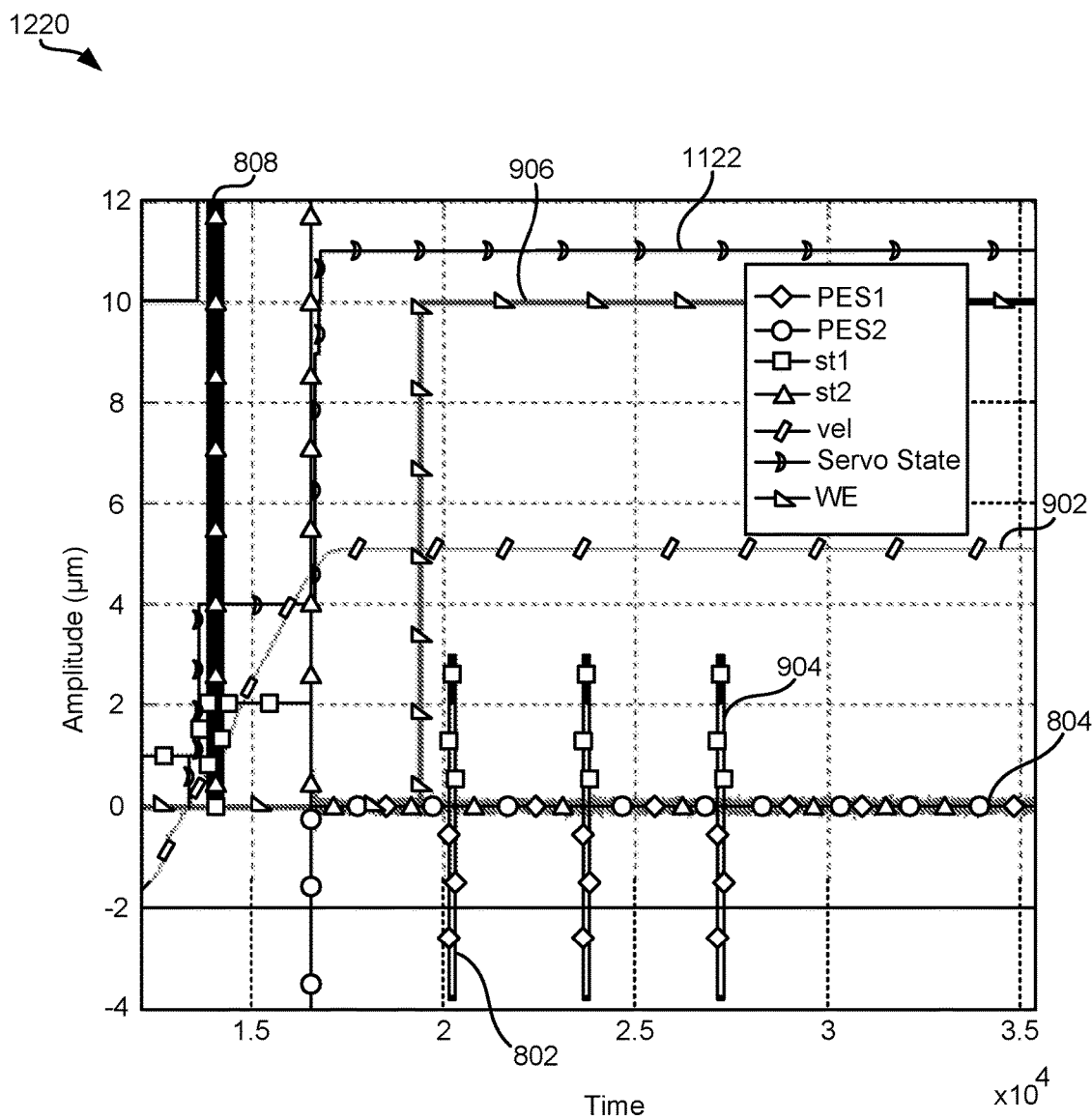
FIG. 12B illustrates a time versus amplitude plot of a created servo signal spike that is characterized by the parameters set in FIG. 12A, in accordance with one embodiment.

FIG. 12B depicts a servo signal plot 1220, in accordance with one embodiment. As an option, the present plot 1220 may be implemented in conjunction with features from any other embodiment listed herein, such as those described with reference to the other FIGS. Of course, however, such plot 1220 and others presented herein may be used in various applications and/or in permutations which may or may not be specifically described in the illustrative embodiments listed herein. Further, the plot 1220 presented herein may be used in any desired environment.

Referring now to FIG. 12B, plot 1220 illustrates three spikes with the parameters as set in operation 1002 of FIG. 12A, and applied to the first servo signal 802. The 10,000 sample count (Scount) start positions are illustrated by the sample count that occurs before each of the three spikes.

The three spikes are illustrated in plot 1220 to each having a duration of 500 samples, corresponding to the Dcount value, and each having an amplitude of 3 μm.

It may be noted that the write enable signal 906 remained on in spite of the created spikes. The write enable remained on because the spikes were detected by the spike detection code, which detected the first spike caused subsequent write sequences to be performed using the second servo channel (which is illustrated by a second servo signal 804 in plot 1220.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A computer-implemented method for simulating a defect signal in a time based servo system, the method comprising:
   determining a start position for a spike;
   determining an end position for the spike;
   determining a servo channel;
   determining an amplitude of the spike;
   initiating an acquire lock process;
   creating the spike in the determined servo channel from the determined start position to the determined end position, the spike having the determined amplitude; and
   storing servo data including at least a portion thereof generated during the spike.

2. The method as recited in claim 1, wherein the spike is created during the acquire lock process.

3. The method as recited in claim 2, comprising determining a state of the acquire lock process for the start position of the spike.

4. The method as recited in claim 3, comprising determining a sample count in the determined state of the acquire lock process for the start position of the spike.

5. The method as recited in claim 3, comprising determining a duration of the spike, and ending the spike upon reaching the duration.

6. The method as recited in claim 2, comprising determining a state of the acquire lock process for the end position of the spike.

7. The method as recited in claim 6, comprising determining a sample count in the determined state of the acquire lock process for the end position of the spike.

8. The method as recited in claim 1, wherein the spike is created during a data process.

9. The method as recited in claim 1, comprising determining a number of times to repeat the spike, and repeating the spike the determined number of times.

10. A computer program product for generating defect signals in a storage system, the computer program product comprising a computer readable storage medium having program instructions embodied therewith, wherein the computer readable storage medium is not a transitory signal per se, the program instructions executable by a controller to cause the controller to perform a method comprising:
    determining, by the controller, a start position for a spike;
    determining, by the controller, an end position for the spike;
    determining, by the controller, a servo channel;
    determining, by the controller, an amplitude of the spike;
    initiating, by the controller, an acquire lock process;
    creating, by the controller, the spike in the determined servo channel from the determined start position to the determined end position, the spike having the determined amplitude; and
    storing, by the controller, servo data including at least a portion thereof generated during the spike.

11. A computer program product as recited in claim 10, wherein the spike is created during the acquire lock process.

12. A computer program product as recited in claim 10, comprising program instructions executable by the controller to cause the controller to determine a state of the acquire lock process for the start position of the spike.

13. A computer program product as recited in claim 12, comprising program instructions executable by the controller to cause the controller to determine a sample count in the determined state of the acquire lock process for the start position of the spike.

14. A computer program product as recited in claim 10, comprising program instructions executable by the controller to cause the controller to determine a duration of the spike, and ending the spike upon reaching the duration.

15. A computer program product as recited in claim 10, comprising program instructions executable by the controller to cause the controller to determine a state of the acquire lock process for the end position of the spike.

16. A computer program product as recited in claim 10, comprising program instructions executable by the controller to cause the controller to determine a sample count in the determined state of the acquire lock process for the end position of the spike.

17. A computer program product as recited in claim 10, wherein the spike is created during a data process.

18. A computer program product as recited in claim 10, comprising program instructions executable by the controller to cause the controller to determine a number of times to repeat the spike, and repeating the spike the determined number of times.

19. An apparatus configured to simulate a defect signal in a time based servo system, the apparatus comprising:
 a controller having a memory, and logic configured to cause the controller to:
 determine a start position for a spike;
 determine an end position for the spike;
 determine a servo channel;
 determine an amplitude of the spike;
 initiate an acquire lock process;
 create the spike in the determined servo channel from the determined start position to the determined end position, the spike having the determined amplitude; and
 store servo data including at least a portion thereof generated during the spike.

20. The apparatus as recited in claim 19, comprising:
 a magnetic head coupled to the controller; and
 a drive mechanism for passing a magnetic medium over the magnetic head.

\* \* \* \* \*